United States Patent [19]
Rougeot et al.

[11] Patent Number: 5,208,460
[45] Date of Patent: May 4, 1993

[54] PHOTODETECTOR SCINTILLATOR RADIATION IMAGER HAVING HIGH EFFICIENCY LIGHT COLLECTION

[75] Inventors: Henri M. Rougeot; Joseph M. Pimbley, both of Schenectady, N.Y.

[73] Assignee: General Electric Company, Schenectady, N.Y.

[21] Appl. No.: 764,291

[22] Filed: Sep. 23, 1991

[51] Int. Cl.$^5$ .............................................. G01T 1/20
[52] U.S. Cl. .................................. 250/368; 250/366; 250/367
[58] Field of Search .................. 250/368, 366, 367

[56] References Cited

U.S. PATENT DOCUMENTS

| | | | |
|---|---|---|---|
| 3,507,734 | 4/1961 | Ruderman | 156/268 |
| 3,936,645 | 2/1976 | Iversen | 250/486.1 |
| 4,720,426 | 1/1988 | Englert et al. | 250/367 |
| 4,906,850 | 3/1990 | Beerlage | 250/370.09 |

FOREIGN PATENT DOCUMENTS 39576  2/1989  Japan ................... 250/368

*Primary Examiner*—Carolyn E. Fields
*Attorney, Agent, or Firm*—Donald S. Ingraham; Marvin Snyder

[57] ABSTRACT

A radiation imager comprising an array of scintillator elements optically coupled to a photodetector array comprises a dielectric layer extending around at least the sidewalls of the scintillator elements, and preferably over the surface of the scintillator elements through which the incident radiation enters, and an optically reflective layer disposed over the dielectric layer. The dielectric layer has an optical index that is less than that of the scintillator material, and consequently light collection efficiency of the scintillator is improved as light photons generated in the scintillator reflected back into the scintillator both at the interface of the scintillator and the dielectric layer and at the optically reflective layer. A dome-shaped surface at the end of the scintillator element through which the incident radiation enters and an undulatory-shaped surface at the end of the scintillator which is optically coupled to the photodetectors further increase the light collection efficiency of the scintillator by reducing the number of photons that undergo total internal reflection in the scintillator.

21 Claims, 3 Drawing Sheets

PHOTODETECTOR SCINTILLATOR RADIATION IMAGER HAVING HIGH EFFICIENCY LIGHT COLLECTION

BACKGROUND OF THE INVENTION

This invention relates generally to radiation imaging systems and more particularly to scintillator designs to improve light collection efficiency.

Radiation imaging systems are widely used for medical and industrial purposes. For example, in nuclear medicine, certain diagnostic tests involve injection into the patient of radionuclides which will concentrate in an organ of interest. Radiation emitted from these radionuclides can be used for examining the organ's structure and its operation. External radiation sources, such as x-ray machines, are also be used for diagnostic purposes. Imaging systems have been developed which used the detected radiation to produce a signal which can be used to operate a visual display, such as a cathode ray tube or liquid crystal display device, or which can be used for other analyses of the pattern of detected x-ray or gamma radiation. In such systems the radiation is typically absorbed in a scintillator material, resulting in generation of photons of light. Light photons emanating from the scintillator are detected by photodetectors to generate an electrical output signal that can be processed to drive the display or analysis system.

Particularly for radiation imagers employed in nuclear medicine procedures, in which it is desired to map the emitted radiation of a very low energy radionuclide taken up in the tissue of the patient, it is important that the imaging device be sensitive to low radiation levels while still being able to discriminate against background radiation. Efficient collection of the light photons generated when the incident radiation is absorbed in the scintillator allows detection of radiation with lower energy levels and thus enhances the diagnostic value of the imaging device.

Light photons generated when incident radiation is absorbed in scintillator material propagate isotropically from the place of the absorption of the incident radiation. Most scintillator structures have a parallelepiped shape, with the photodetectors adjoining one side of the scintillator. Consequently, only a limited number of the photons generated will propagate directly toward the scintillator surface adjoining the photodetector, and consequently it is beneficial to have some means for reflecting and directing other photons towards that surface. Typical prior art imagers provided no reflective material on the scintillator surfaces, such as evidenced by the device of Beerlage disclosed in U.S. Pat. No. 4,906,850. In some devices, it has been suggested that optically opaque materials can be applied to the sidewalls of the scintillator elements, as appears in the device of Iverson disclosed in U.S. Pat. No. 3,936,645 (see col. 7, line 46), or that the scintillator surfaces can be made reflective by polishing or metallizing, as disclosed in U.S. Pat. No. 3,507,734 of Ruderman (see col. 3 line 62–66).

In scintillators having reflective wall surfaces, the reflected photons typically travel a path having numerous interactions with the scintillator wall surfaces before they strike the surface of the scintillator adjoining the photodetector array. Particularly with scintillator geometries having opposed parallel smooth surfaces, a number of photons will undergo total internal reflection, that is, a photon will strike the scintillator surface adjoining a photodetector at an angle that will cause it to reflect back into the scintillator instead of exiting the scintillator, and then travel a path reflecting off other surfaces of the scintillator that will keep it within the scintillator, or involve sufficient interactions with the wall surfaces or reflectors so that the probability that the photon will be absorbed, and hence undetected by the photodetector array, is significantly increased. In either case, total internal reflection results in a smaller number of the total number of photons generated by the absorption of incident radiation in the scintillator from exiting the scintillator for detection by the imager array, thus reducing the photon collection efficiency of the device.

Light photon attenuation remains a problem even when an optically reflective material has been applied along the sidewalls of the scintillator. In optically reflective materials there is nevertheless some absorption of the light, and thus light photons may be either absorbed or reflected when they strike the optically reflective material on the walls of the scintillator. For example, silver has a reflectance of 96%; with that reflectance, a light photon has a 50% chance of being absorbed after just 17 wall interactions. Other commonly used optically reflective materials have even lower reflectance values, such as the 90% value for aluminum. Imaging device performance is thus degraded when a light photon undergoes numerous reflections because there is an increased likelihood that the light photon will be absorbed. Additionally, when those photons that do escape the scintillator to the photodetector are detected over a longer period of time (i.e., some photons generated will exit the scintillator quickly while others will be reflected numerous times before exiting the scintillator) there is not as clear a "peak" of a photon burst to be detected by the photodetectors; this lack of a peak degrades the energy resolution of the imaging device and makes it more difficult for the processing system to discriminate against background noise.

It is thus an object of the present invention to provide an imaging device that exhibits a high light photon collection efficiency.

Another object of the invention is to provide an efficient scintillator that exhibits minimal total internal reflection.

It is a further object of this invention to provide a simple and effective means of reflecting and focussing light photons generated in the scintillator towards the scintillator/photodetector interface.

SUMMARY OF THE INVENTION

In accordance with the present invention, a radiation imaging device comprises an array of scintillator elements which are exposed to incident radiation, and which are coupled to an array of photodetectors. A dielectric layer having an optical or refractive index that is less than that of the scintillator elements extends at least around the sidewalls and preferably around the surface of the scintillator elements through which the incident radiation enters. An optically reflective layer is disposed around the dielectric layer. The surface of the scintillator element through which the incident radiation enters is preferably dome-shaped and the surface of the scintillator element through which the light photons pass to the photodetector array preferably has an undulatory shape with a curvilinear surface extending between a pattern of troughs and crests in the surface, the undulatory shape being selected to minimize internal reflection of light photons striking the surface from within the scintillator.

The dielectric layer may comprise a gas, a liquid, or a solid; the lower optical index of this layer results in more light photons being reflected at the interface of the scintillator and the dielectric layer back into the scintillator element. Light photons that strike the dielectric layer with an angle of incidence greater than the critical angle and enter the dielectric layer will typically reflect off of the optically reflective layer, which preferably comprises a material with a relatively high reflectance, such as silver, gold, aluminum, or a multi-layer dielectric reflector. Light photons reflecting off of these surfaces into the scintillator element will tend to be focussed by the dome shaped surface towards the scintillator/photodetector interface. The pattern of undulations in the scintillator surface adjoining the photodetectors is selected to optimize the number of light photons striking the surface that will pass through to the photodetector array.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which like characters represent like parts throughout the drawings, and in which:

DETAILED DESCRIPTION OF THE PREFERRED EMBODIMENT

Figure 1:
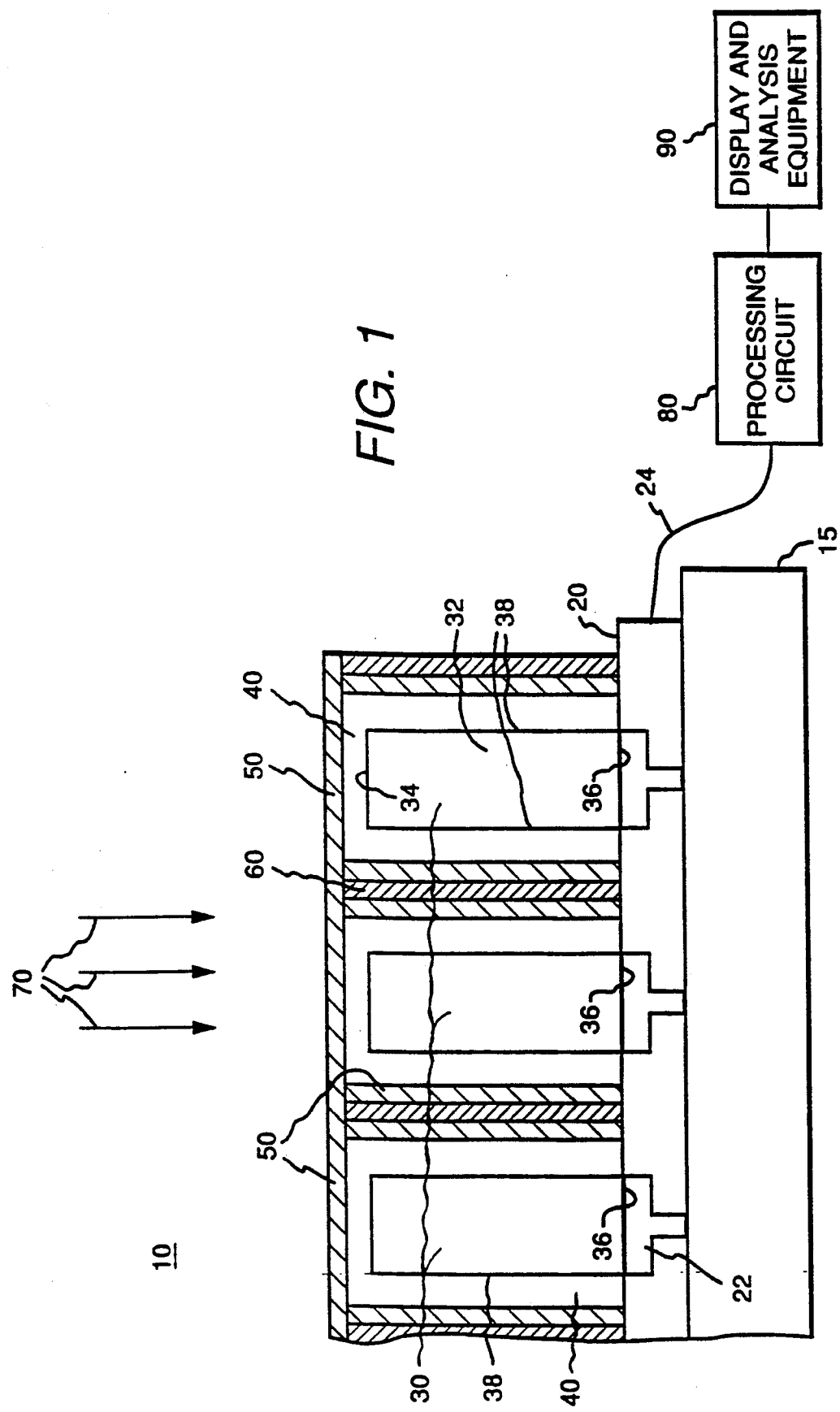
FIG. 1 is a partial cross-sectional view of a device constructed in accordance with one embodiment of the present invention.

In FIG. 1, a radiation imaging device 10 comprises a photodetector array 20 disposed on a substrate 15, a scintillator array 30 comprising a plurality of scintillator elements 32 disposed over the photodetector array, a dielectric layer 40 extending around scintillator elements 32, and an optically reflective layer 50 disposed around the dielectric layer. Photodetector array 20 is coupled to a processing circuit 80, which processes electrical signals generated by the imager array for use in display and analysis equipment 90.

Photodetector or imager array 20 comprises a plurality of photodetectors 22 arranged and electrically connected in a pattern, typically rows and columns. The photodetectors are disposed on imager substrate 15 to form an array that can be of any size and shape appropriate for the use of the imaging device 10, such as for medical analyses of particular portions of the body. The photodetectors are advantageously photodiodes, and alternatively may comprise other known solid state photodetector devices. Substrate 15 preferably comprises glass or ceramic material. A cable 24 carries the electrical signals generated in the photodetector to processing circuit 80.

Figure 3:
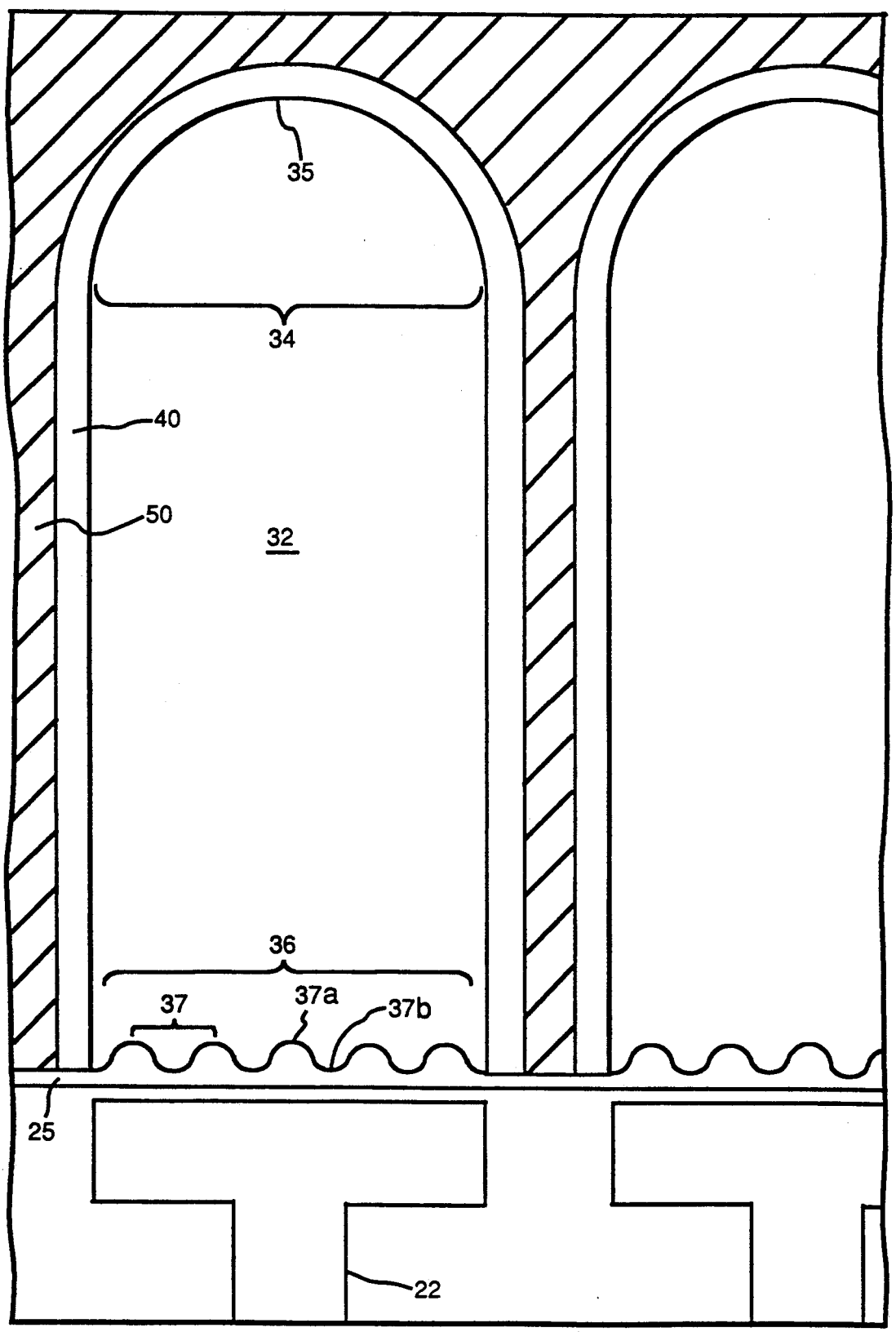
FIG. 3 is a partial cross-sectional view of a scintillator element constructed in accordance with another embodiment of the present invention.

Scintillator 30 is positioned adjacent to, and is optically coupled to, photodetector array 20. As used herein, "optically coupled to photodetector array 20" refers to arranging the two arrays so that light photons from the scintillator readily pass into photodetectors; the optical coupling may include a separate optical coupling layer 25, as shown in FIG. 3, disposed between the scintillator element and the photodetector and which enhances efficient transfer of the light photons from the scintillator to the photodetectors. As illustrated in FIG. 1, scintillator 30 comprises a plurality of separate scintillator elements 32 which can be diced, or cut, from a larger block of scintillator material or which can be separately grown or deposited in columnar structures using a known method such as vapor deposition or sputtering. Each scintillator element comprises a first end surface 34 through which incident x-ray or gamma radiation 70 enters the scintillator elements, and a second end surface 36, which is opposite the first end surface, through which the light photons pass to the adjoining photodetector array 20. Each scintillator element 32 further comprises sidewalls 38 which extend between the respective first end and second end surfaces of the scintillator elements. Cesium iodide is the material that is typically used to form scintillator 30, but the scintillator can alternatively comprise other known scintillating materials.

In accordance with one embodiment of the present invention, as illustrated in FIG. 1, a dielectric layer 40 extends around at least sidewalls 38 of scintillator elements 32, and advantageously can further extend around first end surfaces 34. The dielectric layer adjacent to the scintillator sidewalls and/or first end surfaces increases the number of light photons that are reflected back into the respective scintillator elements when they strike the scintillator sidewall. For two adjacent material having different optical indices, it is known that a light photon propagating through the material having the higher optical index will reflect off of the interface with the material having the smaller optical index when the angle of incidence of the photon on the interface is less than a critical angle; that critical angle is determined by the optical indices of the two adjoining materials.

In the present invention, the dielectric is selected to have an optical index that is less than that of the material comprising the scintillator. A larger critical angle (and hence a likelihood that a greater number of photons will reflect off of the interface) is obtained when the dielectric has a lower optical index. For example, the optical index of cesium iodide, a common material used for scintillators is 1.8; the optical index of clean air is about 1.0. Other dielectric materials, which may comprise a gas, a liquid, or a solid, can alternatively be used if they have an optical index less than the scintillator. Dielectric layer 40 may comprise solid dielectrics such as silicon oxide, polyimides, paralene and cryolite. The thickness of the dielectric layer is advantageously not less than about one-half the wavelength of the characteristic light emission of the scintillator. Cesium iodide, for example, has characteristic light emission in the 400 to 600 nm range; dielectric layer 40 is thus preferably at least 200 to 300 nm thick. The use of the dielectric layer 40 to reflect light photons back into scintillator elements 32 improves imaging device 10 performance by increasing the light collection efficient of the scintillator. The structure of the present invention reduces the number of light photons that escape through the scintillator element's sidewalls or first end surface, and thus increases the number of those light photons that eventually exit the scintillator element at the second end surface and strike the photodetector array.

Figure 2:
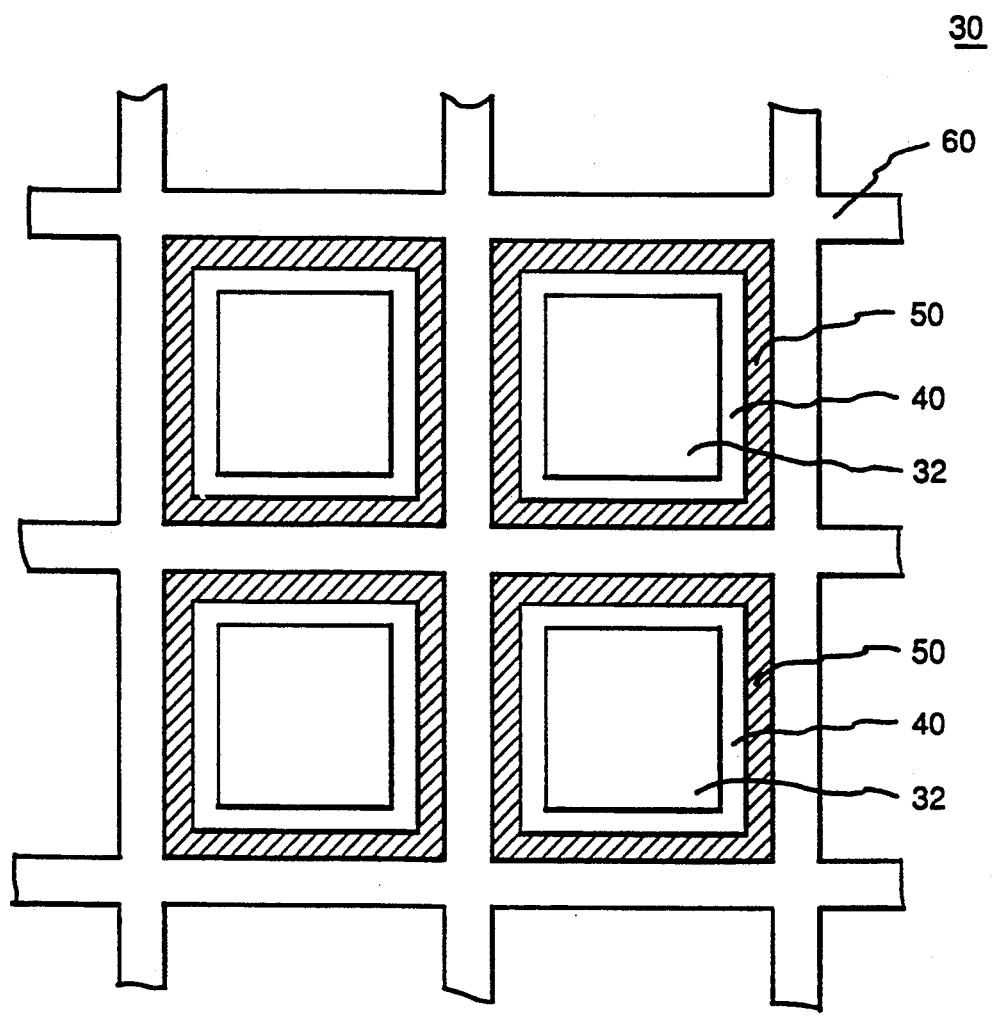
FIG. 2 is a plan view of a portion of a scintillator array constructed in accordance with the embodiment of the present invention shown in FIG. 1.

Optically reflective layer 50 is disposed around layer 40. Light photons that strike the interface between scintillator element 32 and dielectric layer 40 at greater than the critical angle for that interface will pass through dielectric layer 40 and strike optically reflective layer 50, be reflected off of optically reflective layer 50 and travel back through dielectric layer 40 and into scintillator element 32. Optically reflective layer 50 preferably has a specular surface and is comprised of a metal having a relatively high reflectance, such as silver, aluminum, gold, or a multi-layer dielectric reflector. Alternatively, in some embodiments of the invention as more fully described below, reflective materials having a diffuse surface, such as Teflon powdered synthetic resin polymer powder, may be used for portions of optically reflective layer 50, such as over first end surface 34, which may be flat as shown in FIG. 1 or dome shaped as shown in FIG. 2.

Optically reflective layer 50 may be disposed directly on dielectric layer 40 when the dielectric comprises a solid; alternatively, optically reflective layer 50 may be disposed on an interstitial wall matrix 60 or similar structural components in the imager array. In the present invention, interstitial wall members 60 are advantageously disposed around sidewalls 38 of scintillator elements 32 and positioned so that dielectric layer 40 and optically reflective layer 50 are disposed between the interstitial wall member and the sidewalls of the scintillator elements. As appears in FIG. 2, which is a plan view of a portion of scintillator array 30, interstitial wall members 60 are joined together to form a matrix and separate adjoining scintillator elements from one another. Interstitial wall members 60 typically comprise a material such as tungsten, molybdenum, tantalum, uranium, cobalt, or nickel. In a device having interstitial wall members, optical layer 50 is advantageously disposed on wall member 60, and a gas or liquid dielectric layer 40 can be disposed in the space between optically reflective layer 50 and scintillator element sidewall 38. By way of example and not limitation, optically reflective layer 50 may be disposed over scintillator element first end surfaces 34 as a layer of material supported in whole or in part by interstitial wall members 60.

The light collection efficiency of the scintillator is improved in accordance with the present invention by scintillator element first end surfaces 34 having a shape substantially of a dome 35 or hemisphere, as is illustrated in FIG. 3. Dome 35 projects from the otherwise substantially parallelepiped-shaped structure of scintillator element 32. Dome 35 presents a substantially continuous curved surface over which dielectric layer 40 and/or optically reflective layer 50 are disposed, and results in light photons reflected off of the interior of first end surface 34 being directed back into scintillator element 32 along paths that will either directly or indirectly cause them to strike scintillator element second surface 36. The radius of the dome is approximately two to five times of width of scintillator element 32. The domes are readily shaped by selectively applying an etchant to an upper portion of the column forming scintillator element 32 so that the edges will etch more rapidly than the center, resulting in the curved, dome-shaped surface 35. In some embodiments of the present invention, such as when a gas dielectric layer 40 extends around sidewalls 38, it would be difficult to have the dielectric layer and the optically reflective layer both extend over dome 35; in such a structure, the portion of optically reflective layer 40 disposed around dome 35 may be deposited directly on the outer surface of the dome and may comprise a material with specular surfaces as described above or a material with a diffuse surface, such as Teflon powdered synthetic resin polymer powder.

Light collection efficiency of the scintillator is also improved in accordance with the present invention when the scintillator element second surface 36 has ripples or undulations 37 formed therein. The undulatory shape is selected to optimize transmission through scintillator second end surface 36 of light photons striking this surface from within the scintillator, that is internal reflection of the photons striking the surface is reduced from what would be experienced if second surface 36 were planar. Thus, the second end surface 36 of scintillator element 32 is curvilinear between each adjacent pair of a trough 37a and a crest 37b. It has been observed that optimum transmission of incident light photons through second surface 36 is obtained when the maximum angle between reflected paths of light photons which had substantially parallel incident paths when striking any two points on the interior of curvilinear surface has a value of $\pi/60$ radians. In effect, the curvilinear surface makes it unlikely that a light photon will become "trapped" in the scintillator element, i.e., be continually internally reflected until it is absorbed; thus a photon that strikes second end surface 36 and is reflected is unlikely to again strike the curvilinear surface at an angle that would again cause it to be internally reflected. The curvilinear surface can be formed by grinding or preferentially etching second end surface 36. Scintillator elements 32 having undulations 37 are optically coupled to photodetector array 20 via an optical coupling medium 25 which conforms to the curvilinear surfaces of scintillator element 32; such an optical coupling medium is disclosed in the allowed copending application of J. D. Kingsley, et al., Ser. No. 07/590,846, filed Oct. 1, 1990, now U.S. Pat. No. 5,153,438, assigned to the assignee of the present invention, and incorporated herein by reference.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A radiation imaging device comprising:
   an array of photodetectors;
   a plurality of scintillator elements arranged in an array, each of said elements having a first end surface through which incident radiation enters the scintillator element and a second end surface optically coupled to said photodetector array, each of said scintillator elements further having sidewalls extending between said first and second end surfaces;
   a non-optically diffusive dielectric layer disposed immediately adjacent to and extending around at least said sidewalls of each of said scintillator elements, said dielectric layer having an optical index that is less than the optical index of said scintillator element; and an optically reflective layer adjoining said dielectric layer.

2. The device of claim 1 wherein said dielectric layer extends over said first end surfaces of said scintillator elements.

3. The device of claim 1 wherein each of said first end surfaces is dome-shaped.

4. The device of claim 3 wherein the radius of said dome-shaped end surface is between about 2 and about 5 times the width of said scintillator element.

5. The device of claim 1 wherein said dielectric layer comprises a gas.

6. The device of claim 1 wherein said dielectric layer comprises a liquid.

7. The device of claim 1 wherein said dielectric layer comprises a solid.

8. The device of claim 7 wherein said dielectric layer comprises one of the group consisting of silicon oxide, polyimide, paralene, and cryolite.

9. The device of claim 1 wherein the thickness of said low optical index dielectric layer is not less than about one-half the wavelength of characteristic light emission of said scintillator element.

10. The device of claim 1 wherein said optically reflective layer comprises a material having a specular surface.

11. The device of claim 10 wherein said optically reflective layer comprises one of the group consisting of aluminum, silver, gold, and multi-layer dielectric reflectors.

12. The device of claim 1 wherein said second end surfaces of said scintillator elements are each of an undulatory shape, said undulatory shape being selected to minimize internal reflection of light photons striking said second surface from within said scintillator element.

13. The device of claim 12 wherein said shaped second end surface is curvilinear between each adjacent pair of a trough and a crest.

14. The device of claim 13 wherein said curvilinear surface of each scintillator element is shaped so that the maximum angle between reflected paths of light photons travelling in substantially parallel paths when incident on any two points on the interior of said curvilinear surface is $\pi/60$ radians.

15. The device of claim 1 wherein said scintillator elements comprise cesium iodide.

16. A radiation imaging device comprising:
an array of photodetectors;
a plurality of scintillator elements arranged in an array, each of the elements having a first end surface through which incident radiation enter the scintillator element and a second end surface optically coupled to said photodetector array, each of said elements further having sidewalls extending between said first and second end surfaces;
said scintillator array being optically coupled to said photodetector array via an optical coupling medium disposed therebetween;
said first end surfaces of said scintillator elements being substantially dome shaped and said second end surfaces being curvilinear and having a rippled shape so as to optimize passage of said light photons striking said second surface from within said scintillator element to said photodetector array;
a dielectric layer extending around at least said sidewalls of each of said scintillator elements, said dielectric layer having an optical index that is less than the optical index of said scintillator element;
a plurality of interstitial wall members connected together and disposed around the sidewalls of each of said scintillator elements, said wall members being positioned so that said dielectric layer is disposed between a respective one of said wall members and a respective one of said scintillator element sidewalls;
an optically reflective layer disposed on the surfaces of said interstitial wall members and adjoining said dielectric layer, said optically reflective layer further being disposed over said dome-shaped scintillator first end surfaces;
a processing circuit coupled to receive signals generated by said photodetector array; and
display and analysis equipment coupled to, and responsive to, said processing circuit for displaying images in response to radiation detected by said array of photodetectors.

17. The device of claim 16 wherein said dielectric layer comprises air.

18. The device of claim 16 wherein said dielectric layer comprises one of the group consisting of silicon oxide, polyimide, paralene, and cryolite.

19. The device of claim 16 wherein said optically reflective layer comprises a material of the group consisting of aluminum, silver, gold, and multi-layer dielectric reflectors.

20. The device of claim 16 wherein said scintillator elements comprise cesium iodide.

21. The device of claim 16 wherein said interstitial wall members comprise a material of the group consisting of tungsten, molybdenum, tantalum, uranium, cobalt and nickel.

* * * * *